United States Patent [19]

Wheeler

[11] Patent Number: 4,815,673
[45] Date of Patent: Mar. 28, 1989

[54] STREAMLINED PRODUCTION OF ELECTRIC MOTOR ARMATURES AND STATORS

[75] Inventor: Dale K. Wheeler, Fallston, Md.
[73] Assignee: Black & Decker Inc., Newark, Del.
[21] Appl. No.: 185,328
[22] Filed: Apr. 21, 1988

Related U.S. Application Data

[62] Division of Ser. No. 880,896, Jul. 1, 1986, abandoned.

[30] Foreign Application Priority Data

Jul. 15, 1985 [GB] United Kingdom ............... 8517771

[51] Int. Cl.⁴ ........................................... H02K 15/09
[52] U.S. Cl. ..................................... 242/7.09; 29/596;
29/598; 29/732; 198/346.1; 198/358;
198/465.1; 198/570; 414/495
[58] Field of Search .................. 242/7.09, 7.10, 7.03,
242/1.1 R, 7.05, 35.5 A; 29/596, 598, 736, 732,
759; 198/346.1, 346.2, 341, 365, 358, 465.1, 570;
414/495

[56] References Cited

U.S. PATENT DOCUMENTS

| | | | |
|---|---|---|---|
| 3,691,606 | 9/1972 | Muskulus | 29/732 |
| 3,777,873 | 12/1973 | Stuart | 198/346.2 |
| 4,087,054 | 5/1978 | Finegold . | |
| 4,151,636 | 5/1979 | Lauer et al. | 29/736 X |
| 4,186,478 | 2/1980 | Hamane et al. | 29/596 |
| 4,223,774 | 9/1980 | Aycut | 198/365 |
| 4,296,543 | 10/1981 | Hamane et al. | 29/596 |
| 4,316,535 | 2/1982 | Brems et al. . | |
| 4,483,433 | 11/1984 | Fischer et al. | 198/346.2 |
| 4,564,147 | 1/1986 | Rohner | 242/35.5 A |
| 4,612,702 | 9/1986 | Wheeler . | |
| 4,634,066 | 1/1987 | Matsui et al. | 242/35.5 A |
| 4,648,176 | 3/1987 | Moser | 29/596 |

FOREIGN PATENT DOCUMENTS 0191195 8/1986 European Pat. Off. .

OTHER PUBLICATIONS

International Search Report PCT/US 87/01061.

Primary Examiner—Carl E. Hall
Attorney, Agent, or Firm—Edward D. Murphy; Charles E. Yocum; Edward D. C. Bartlett

[57] ABSTRACT

Two production lines for the manufacture of armatures or stators for electric motors are separated over at least part of their length by a common partition. The juxtaposed proximity of the two production lines allows operations on articles on both lines to be carried out simultaneously by equipment mounted on a common operating head. Shuttles are provided upstream and downstream of coil winding areas so that armature or stator bodies from one production line can be automatically diverted to a winder on the other production line and returned when wound. The height of the laminations is determined by picking a stack close to the maximum height permissible, measuring this height and, if necessary, removing a lamination via a vacuum line mounted on a measuring head. After winding, the ends of the magnetic wires on the armature are stripped using a laser. The dual highway style production lines provide economy in floor space and operators, and by use of the transfer shuttles enable bottlenecks of one line to be handled by the other line.

11 Claims, 17 Drawing Sheets

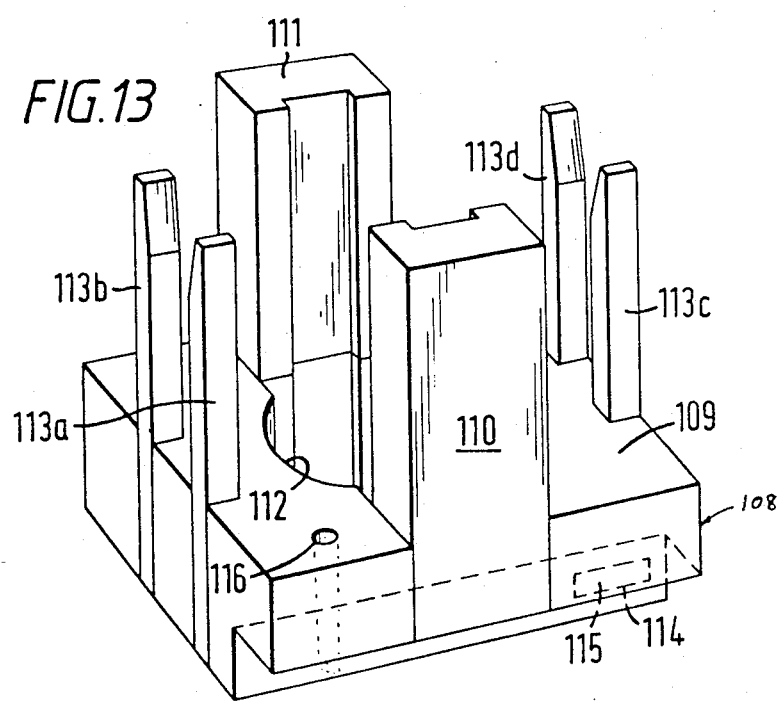

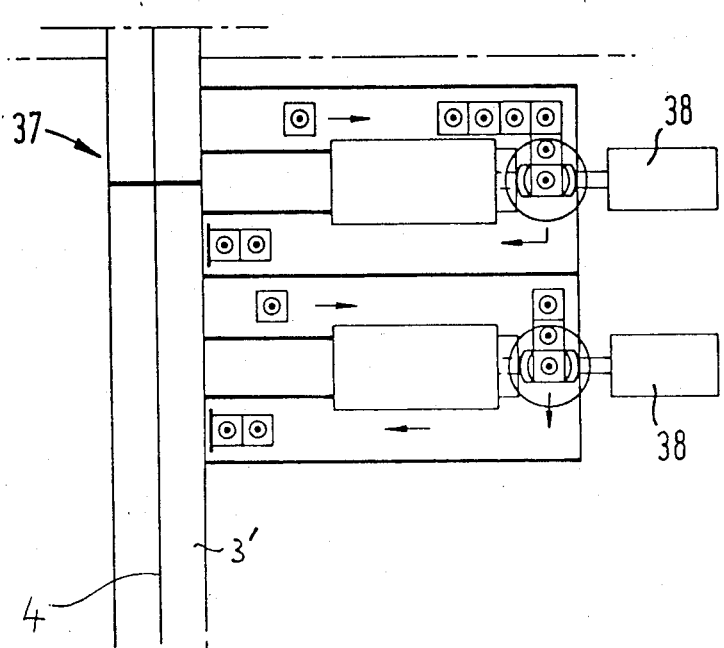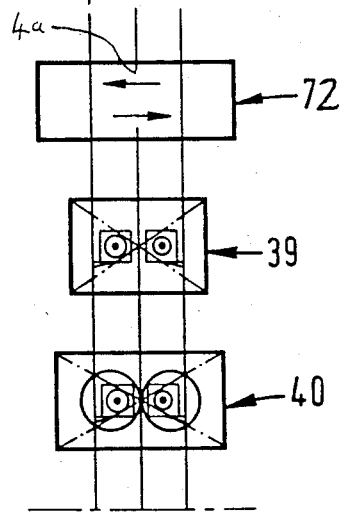
FIG.2D

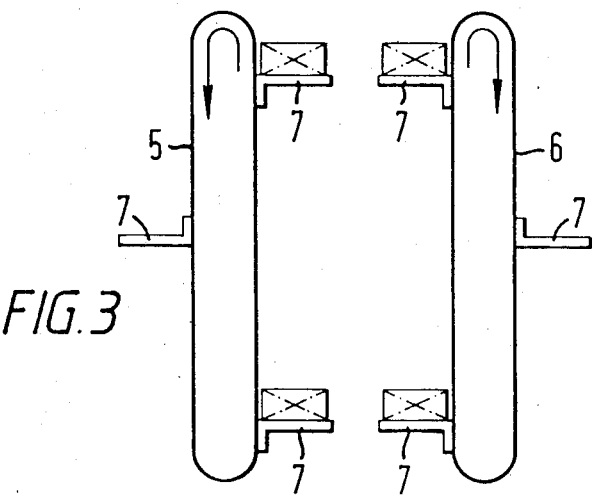
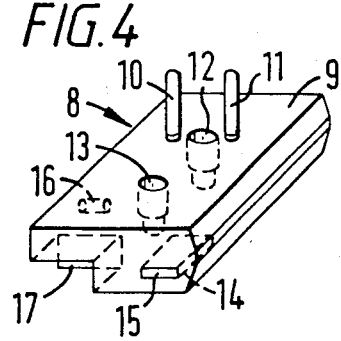
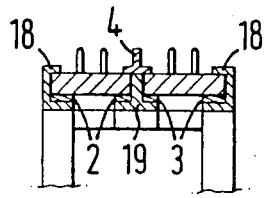
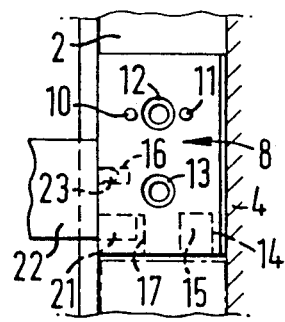

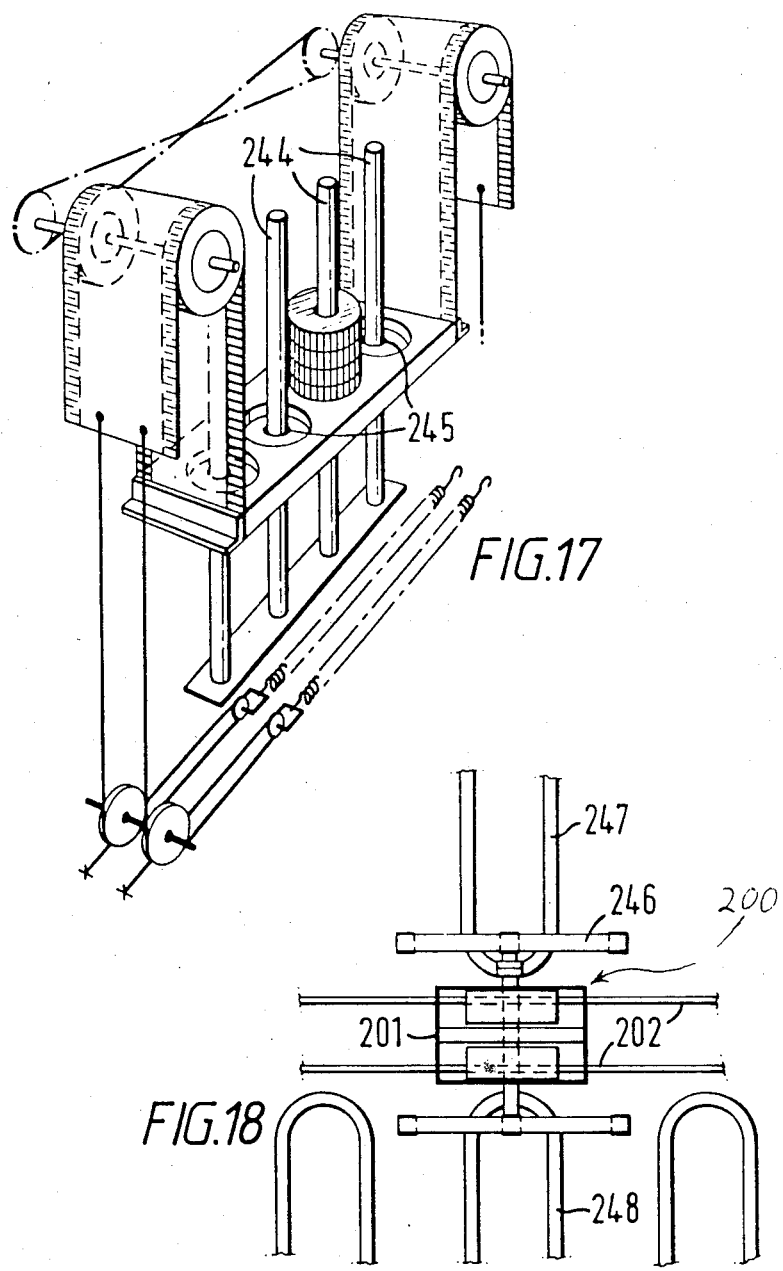

STREAMLINED PRODUCTION OF ELECTRIC MOTOR ARMATURES AND STATORS

This is a division of application Ser. No. 880,896, filed July 1, 1986 now abandoned.

FIELD OF THE INVENTION

This invention relates to the manufacture of electric motors, particularly to methods and production lines for the production of armatures and stators.

BACKGROUND OF THE INVENTION

An electric motor essentially comprises an armature assembly and a stator assembly both of which are individually produced on separate production lines after which the armature and the stator assemblies are assembled together.

In order to make two electric motors of different sizes, for example with armatures of 47 mm and 57 mm diameter, it has been the practice to have four separate and distinct production lines, i.e. two for the armatures and two for the stators.

Each production line occupies a substantial floor space. Furthermore, each production line has its own independent equipment and its own staff.

SUMMARY OF THE INVENTION

One aspect of the present invention, at least in its preferred embodiments, aims to reduce the floor space occupied by such production lines by 60 to 70% and, at the same time, reduce staffing levels by 25 to 50%.

According to one aspect of the invention there is provided two production lines for the manufacture of armatures or stators for electric motors separated along at least part of the length thereof by a common partition. The pair of production lines being designated for the production of one of the two major subassemblies of electric motors, i.e. either the armatures or the stators.

By placing the production lines close together many operations can be carried out using a common operating head thereby substantially reducing duplication of operating mechanisms.

Preferably, one or more shuttles are provided for transferring articles from one production line to the other and vice-versa. Preferably, the shuttles are disposed one upstream and one downstream of the coil winding areas.

This has significant advantages, particularly where there is a temporary demand for the increase in production of one type of motor. Thus, for example, if there is a temporary increased demand for 47 mm armatures, one or more coil winders on the 57 mm production line can be assigned to 47 mm winding duty. A number of 47 mm line by the shuttle, wound on the conscripted winder and returned to the 47 mm line downstream of the winding area.

The armatures and/or stators can be transported on pallets which are preferably provided with identifying means, such as identifying inserts, which enable them to be identified as they approach an operating station. When the queue to the winder on the 57 mm production line is not full, a signal is sent to a shuttle which diverts the appropriate number of units from the 47 mm production line. As these units pass through the 57 mm winding area they are ignored by all the winders with the exception of the conscripted winder which identifies them and admits them to its queue. The wound units are similarly identified as they approach the downstream shuttle and are returned to the 47 mm production line.

In both armature and stator manufacture, an end member is first laid on an assembly pallet. The end member is then covered with a stack of laminations. The total height of the stack must be within a prescribed range. Heretofore, it has been the practice to pick a stack with a height about the minimum of the range, check the height and, if necessary, add a further lamination. This requires a first stacker station, a measuring station and a second stacker station.

According to another aspect of the present invention, there is provided a method of obtaining a stack of armature or stator laminations of a height within a defined range, which method comprises the steps of picking a stack close to the maximum height permitted, checking the height of the stack, and removing a lamination if the measured height is greater than the maximum height.

Preferably, the height of the stack is measured with a measuring head and the lamination is removed, if necessary, with means associated with the measuring head. Advantageously, the means comprises a vacuum line.

It will be appreciated that by using this technique only one stacker station is required thereby making useful savings both in capital cost and in production line length. The discarded laminations can, of course, be recycled to the stacker.

Once the windings are completed, it is necessary to make electrical contact between the magnet wire used in the winding and either the commutator ring in the case of the armature or terminals in the case of the stator. This may be achieved in several ways.

A further aspect of the present invention provides a method of stripping the ends of magnet wire on an armature or a stator, which method comprises the step of subjecting the ends of the magnet wire to a laser beam. Although the magnet wires could be individually indexed into position and the laser activated, in the case of an armature, it is preferred to place a mirror between the main winding and the ends of the magnet wire on the armature and rotate the armature beneath the laser.

The present invention also provides buffer storage which comprises a platform for supporting electric motors or parts thereof in layers, and means which, as said platform is loaded, lower said platform so that it remains substantially horizontal at all times.

Preferably, the buffer storage comprises means which lower the platform at a rate such that when the platform is covered with a layer of articles the tops of the articles lie in substantially the same plane as the platform before the articles were applied. Advantageously, each end of the platform may be supported by a respective belt which passes upwardly and over a respective wheel and is connected, at the other end thereof to at least one respective spring. Preferably, the belts are provided with spacer members at vertically spaced locations to facilitate the loading of the buffer storage. Advantageously, the wheels may be provided with teeth and the belts are provided with teeth which mesh with the teeth on said wheels. Preferably, the wheels are mounted fast with respect to other toothed members and said other toothed members are interconnected by a chain arranged in a figure of eight configuration so that any vertical movement at one end of the platform is accompanied by an equal movement at the other end thereof. Advantageously, the platform may be scalloped to receive a row of armatures therein.

According to another aspect of the present invention, there is provided a method of simultaneously producing similar subassemblies for two different motor specifications, comprising the steps of advancing subassemblies of first and second specifications along two side by side production lines, one for each specification, and at a winding station transferring some of the subassemblies from one production line to the other line and winding coils thereof on the other line, and thereafter returning these same subassemblies back to said one line, whereby the rate of production of the subassemblies on said one line is increased.

Other objects, features and advantages of the present invention will become more fully apparent from the following detailed description of the preferred embodiments, the appended claims and the accompanying drawings.

BRIEF DESCRIPTION OF THE DRAWINGS

In the accompanying drawings:

FIG. 1 is a block diagram showing the layout of FIGS. 2A to G;

FIGS. 2A to G show a schematic layout of a dual highway armature production line;

FIG. 3 is a schematic cross-section of two elevators taken along line III—III of FIG. 2A;

FIG. 4 is a perspective view of an armature assembly pellet;

FIG. 5 is a schematic cross-section taken along line V—V of FIG. 2A;

FIG. 6 is a schematic plan view of an assembly pallet awaiting end fibre placement;

FIG. 11 is a block diagram showing the layout of FIGS. 12A to C;

FIG. 13 is a perspective view of a stator assembly pallet;

FIG. 17 is a perspective view of part of a buffer storage for gears; and

FIG. 18 is a plan view showing the buffer storage of FIG. 16 in use.

DETAILED DESCRIPTION OF THE PREFERRED EMBODIMENT

Figure 2A:
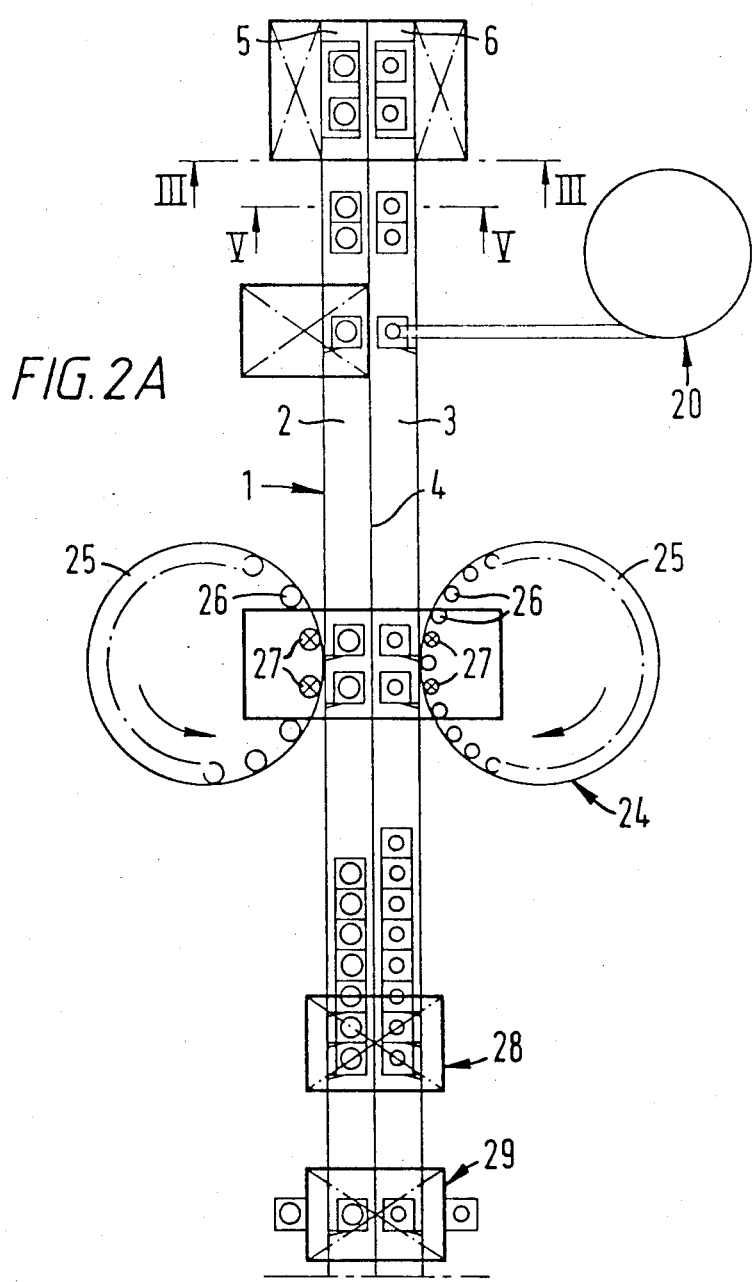
Figure 2B:
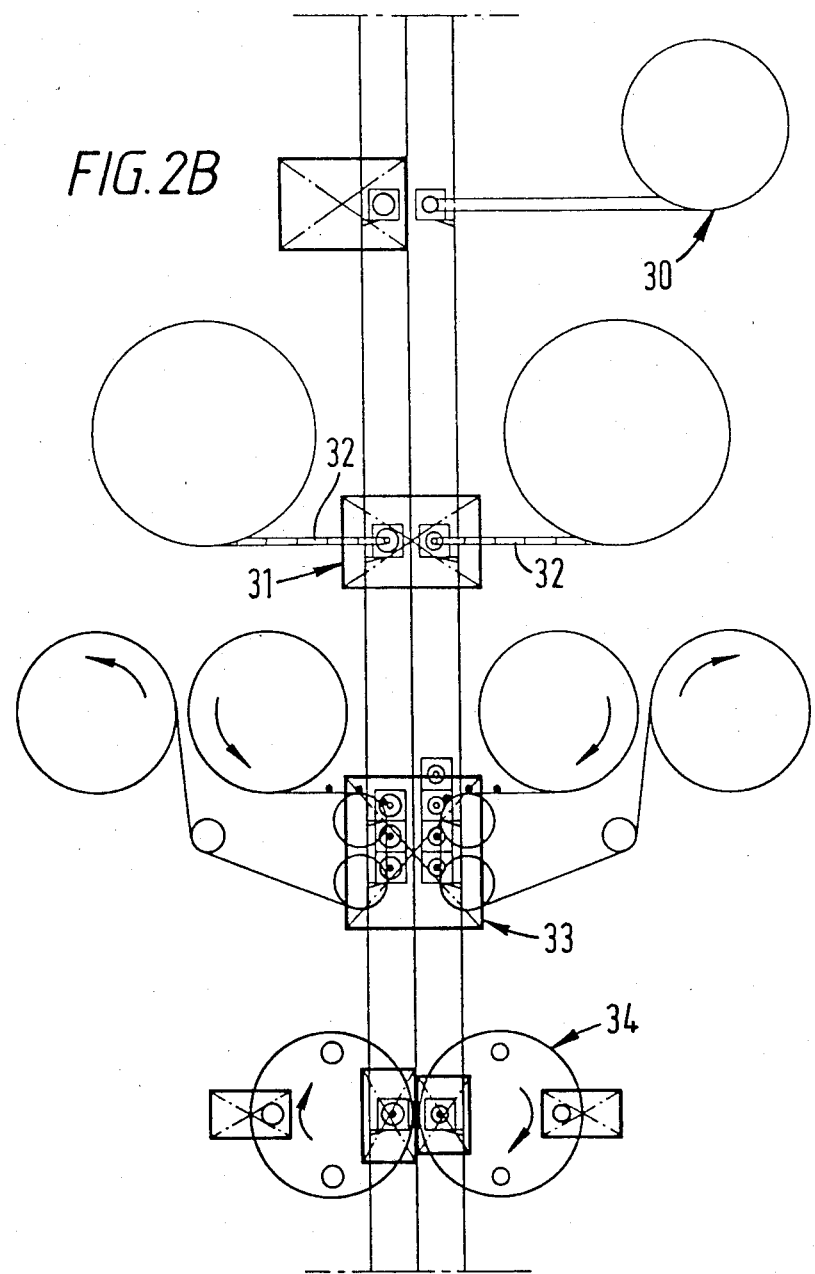
Figure 2C:
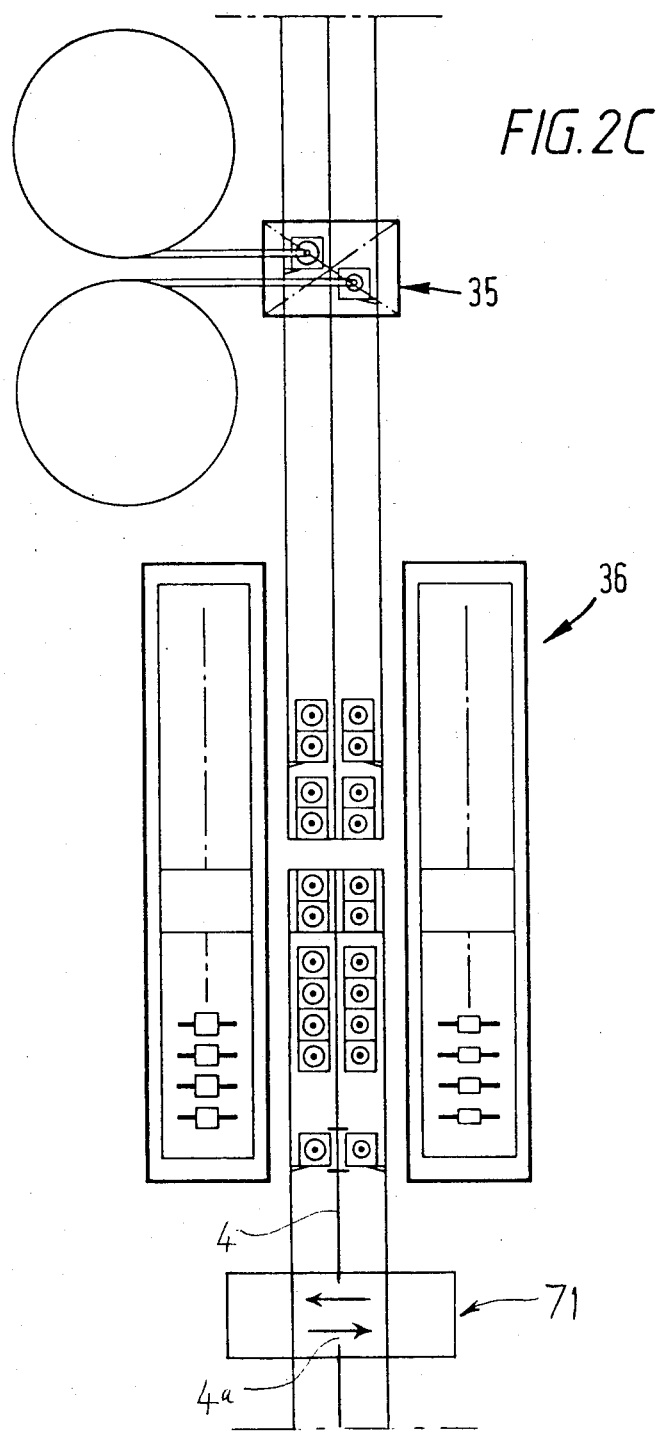

The preferred embodiment of complete armature and stator production lines according to the present invention are illustrated in FIGS. 1 through 18. For ease of understanding, various sections or aspects of these production lines will be separately described with the use of appropriate subheadings.

DUAL HIGHWAY ARMATURE PRODUCTION LINE

Referring to FIGS. 2A to 2G there is shown a dual highway armature production line which is generally identified by reference numeral 1. FIGS. 2A to 2G should be taken in sequence together as a single drawing as schematically indicated in FIG. 1.

The dual highway armature production line 1 comprises two conveyors 2 and 3 which are separated by a stationary partition 4. The conveyors 2 and 3 are driven at the same speed by separate and distinct variable speed motors (not shown).

ELEVATOR

Two elevator 5 and 6 are arranged at the beginning of the production line to raise armature assembly pallets to the level of conveyors 2 and 3, respectively. Each elevator has a plurality of trays 7 (FIG. 3) which can each accommodate two armature assembly pallets. The elevators 5 and 6 are independently controllable and can together raise 3600 armature assembly pallets per hour to the level of the conveyors 2 and 3. The armature assembly pallets are transferred to the conveyors 2 and 3 by plungers (not shown).

ARMATURE ASSEMBLY PALLETS

FIG. 4 shows an armature assembly pallet which is generally identified by reference numeral 8. The armature assembly pallet is made of mild steel and comprises a base 9 which is approximately 63 mm wide, 75 mm long and 25 mm deep. The top of the base is provided with two upwardly extending pins 10 and 11 which are relieved adjacent the base 9. The pins 10 and 11 are disposed to either side of a counterbored hole 12. A similar counterbored hole 13 is disposed adjacent the counterbored hole 12. One side of the base 9 is provided with a slot 14 which accommodates an identifying insert 15. The base is provided with a positioning arrangement which comprises a horizontally extending bore 16 and a cut-out 17.

As shown in FIG. 5, the bottoms of the bases 9 of the armature assembly pallets rest on their respective conveyors 2 and 3, while the sides are confined between side members 18 and beam 19 which supports the stationary partition 4. The installation shown in intended for the simultaneous production of armatures having a nominal diameter of 57 mm and 47 mm. The identifying inserts 15 on the armature assembly pallets are appropriately coded and the armature assembly pallets intended for the production of 57 mm armatures pass along conveyor 2, while those intended for the production of 47 mm armatures pass along conveyor 3.

END FIBRE PLACEMENT

The first stage in making an armature is the construction of the armature core assembly. As the empty armature assembly pallets are carried down the dual highway armature production line 1 by conveyors 2 and 3 they enter station 20 (FIG. 2A). The following events then occur on the armature assembly pallet 8 on conveyor 2.

As the armature assembly pallet enters the station 20 it engages a stop 21 (FIG. 6) which projects across the path of the conveyor 2. When engagement is sensed, an arm 22 is moved to the right so that a shot pin 23 enters the horizontally extending bore 16 in the armature assembly pallet 8 and urges it against the stationary partition 4. Once the armature assembly pallet 8 is in position, a moulded end fibre is lowered onto the armature assembly pallet 8 with a low vertical pressure slide (not shown). The moulded end fibre is made of plastics material and comprises a hub with outwardly projecting spokes which are correctly orientated with respect to the armature assembly pallet 8 by the slide. An escapement alternately holds back and releases the moulded end fibre in correct timing with the slide so that a moulded end fibre can be pressed onto an armature assembly pallet 8 as soon as it is correctly located. Once the moulded end fibre is in position the arm 22 is withdrawn to allow the armature assembly pallet 8 to continue its journey. The arm 22 is then advanced so that the stop 21 is ready to sense the next armature assembly pallet.

While this is happening, conventional end fibre placement is performed on the armature assembly pallet on conveyor 3. The total time taken for armature assembly pallet transfer and placement of the end fibre is about 2.25 seconds.

STACKER STATION

The armature assembly pallets pass to a stacker station 24 where they are sensed and detained in pairs to each side of the stationary partition 4. A dispenser 25 is disposed to each side of the production line. Each dispenser contains a plurality of stacks 26 of armature laminations 27 (FIG. 2A). Each stack 26 is biased upwardly against retaining fingers by a damped piston and cylinder arrangement (not shown). In use a common operating head moves four universal grippers into a position such that two universal grippers are positioned over two stacks 26 of one dispenser 25 and two universal grippers are positioned over two stacks 26 of the other dispenser 25. As the universal grippers move into position they displace the retaining fingers thereby allowing the armature laminations 27 to rise into the universal grippers. The grippers are then raised until they reach an air cylinder stop which determines the height of the stack to be removed. This height is set at the maximum height in the acceptable range of heights. The grippers and the gripped stacks are then removed upwardly sufficiently rapidly to enable the retaining fingers to move into place above the remaining armature laminations without displacing further laminations.

The stacks of armature laminations are placed on the armature assembly pallets between the pins 10 and 11 and over the counterbored hole 12. Once the stacks of armature laminations are correctly positioned, the armature assembly pallets are released and continue down the production line.

SPLIT STACK STATION

The assembly pallets then enter a split stack station 28 (FIG. 2A) where they are sensed and detained in pairs to each side of the stationary partition 4. A common operating head having two bars pivotally mounted thereon and having a gripper at both ends thereof descends onto the stacks so that the grippers on each bar grip the top 75% of armature laminations on successive armature assembly pallets. The common operating head is then raised and the bars are rotated through 180 degrees by a common chain drive. The common operating head is then lowered and the armature laminations released. The common operating head is then raised by a small distance and the grippers actuated so that the grippers on each bar grip the top 25% of the armature laminations on successive armature assembly pallets. The operating head is then raised, the bars rotated through a further 180 degrees and the armature laminations replaced. As a result of this operation inaccuracies in the manufacture of the armature laminations tend to be balanced out.

MEASURING STACK

The armature assembly pallets then pass to a measuring station 29 (FIG. 2A) where they are sensed and detained individually to each side of the stationary partition 4. A common operating head with individually adjusted measuring heads descends onto the stacks. If a stack exceeds the maximum height permissible a vacuum line leading to the pertinent measuring head is actuated and an armature lamination removed from the relevant stack. The removed armature lamination is then returned to the stacker station for re-use.

OTHER END FIBRE PLACEMENT

The armature assembly pallets then pass to station 30 (FIG. 2B) where they are sensed and detained in pairs to each side of the stationary partition 4. End fibres are then placed over the upper end of each armature in a manner similar to that described with reference to station 20.

SHAFT INSULATION PLACEMENT STATION

The armature assembly pallets then pass to station 31 (FIG. 2B) where they are sensed and detained individually to each side of the stationary partition 4. A tube 32 is fed horizontally toward each armature assembly pallet, cut to length and then moved into a vertical position. Each tube is then pressed through the top end fibre, the stack of armature laminations and the bottom end fibre by a common operating head. The tube 32 comes to rest in the counterbore portion of the counterbored hole 12 (FIG. 4) in the respective pallet.

SHAFT PLACEMENT STATION

The armature assembly pallets then pass to station 33 (FIG. 2B) where they are sensed and detained in pairs to each side of the stationary partition 4. A common operating head simultaneously presses a shaft through each shaft insulation tube. The shafts come to rest adjacent the bottom of the counterbored holes 12. The shafts are arranged in plastic chain carriers which align the shafts with the shaft insulation tubes. The operating head then presses the shafts out of the carrier, through a guide member into the shaft insulation tube.

SLOT LINING STATION

The armature assembly pallets then pass to a slot lining station 34 (FIG. 2B) where the outer periphery of the armature laminations is provided with an insulating lining. This can be achieved conventionally (as shown) or by transferring the assembly in counterbored hole 12 to counterbored hole 13 (FIG. 4) and inserting prepunched slot liners into the slots either individually or in pairs on opposite sides of the armature.

COMMUTATOR PLACEMENT STATION

The armature assembly pallets then pass to station 35 (FIG. 2C) where they are sensed and detained individually to each side of the stationary partition 4. A common operating head descends and the armature assemblies are indexed to an appropriate position. A commutator ring is then placed on the upper end of each armature assembly. The commutator rings are supplied from two vessels both disposed to one and the same side of the production line. This has the advantage of increasing access to the production line on the opposite side to the vessels.

The completed armature core assemblies then pass to a buffer zone 36 (FIG. 2C) where the cores are removed from the armature assembly pallets which are returned to the elevators 5 and 6 (FIG. 2A).

WINDING AREA

The completed armature core assemblies are transferred from the buffer zone 36 to winding pallets and pass to a winding area 37 (FIG. 2D) which comprises a multiplicity of "flow through" dual winders 38. The winding pallets enter a winder 38 with the armatures substantially vertical and their commutator rings uppermost. An overhead chuck descends and grips the armature which is fed into the winding loop. The armature core assembly is then wound with magnet wire in the conventional manner. The wound armature is removed from the winding loop and is returned to the conveyor 3' which is about 1 meter higher than the input conveyor. The ends of each wire are wound around respective tangs on the commutator ring during the winding operation.

SHUTTLE STATIONS

Shuttle stations 71 and 72 are provided both upstream and downstream of the winding area 37. Each shuttle station 71, 72 functions to transfer selected winding pallets from one production highway to the other, the pallets so transferred passing through gaps 4a in the dividing partition 4. The selected pallets are pushed transversely from one side of the partition to the other by air cylinders, each pallet so transferred engaging against a stop when the transfer is completed. Endless belt cross conveyors may be employed in place of the air cylinders. Winding of the armature coils at the winders 38 is the slowest operation in the production line, and for that reason multiple winders 38 are employed. Should one of the dual production lines have a heavier winding load than the other, then a percentage of the armatures on the production line having this heavier winding load can be transferred by the upstream shuttle 71 to the other production line and the coils of the transferred armatures wound on one of the winders of the other production line. After winding, these transferred armatures are then returned to their original production line by the downstream shuttle 72. The winder of the other production line so used can be changed in winding specification should this be necessary. Identification inserts in the pallets are used to enable the conscripted winder to identify transferred armatures, and also for the downstream shuttle 72 to select these transferred armatures for return to their original production line. The upstream shuttle 71 can select the armatures to be transferred on a numerical basis, e.g. each tenth armature. More than one winder 38 can be so conscripted if production conditions or requirement would benefit from this. For example, in an extreme situation when all the winders for one production line were inoperative, for example by failure of a common drive, then temporarily half the winders of the other production line could be conscripted to keep both production lines operating, but at a reduced rate.

Similar pairs of shuttle stations can be provided upstream and downstream of any other operational stations in the production lines to provide similar versatility of production with these stations.

INSULATION REMOVAL STATION

The winding pallets then pass to an insulation removal station 39 (FIG. 2D) where they are sensed and detained individually to each side of the stationary partition 4. A mirror is placed immediately over the end of the armature windings and the wound armature is rotated through 360 degrees beneath a low power pulsed laser. As the laser hits the insulated magnet wire the insulation vaporises leaving a cleaning stripped wire in the vicinity of the tangs. A hood is provided to extract the fumes. The mirror protects the ends of the armature windings.

CRIMPING STATION

The winding pallets then pass to a crimping station 40 (FIG. 2D) where they are sensed and detained individually to each side of the stationary partition 4. A common operating head descends and the tangs of each commutator rings are then crimped to their respective uninsulated wires by crimping tools which each comprise a plurality of crimping heads which are electrically insulated from one another. This enables the armature windings to be electrically tested during the crimping operation.

As an alternative to crimping, the wires may be fused to their respective tangs. For this purpose the winding pallet is correctly positioned. The wound armature is then raised so that the commutator ring is disposed between two horizontally opposed weld heads. The wound armature is then indexed and the weld heads activated to fuse two wires to their respective tangs. The armature is then reindexed and the process repeated until all the wires have been fused to their respective tangs. Finally, the armature is returned to its winding pallet.

SLOT LINING FINISHING—CUT AND TUCK

Figure 7:
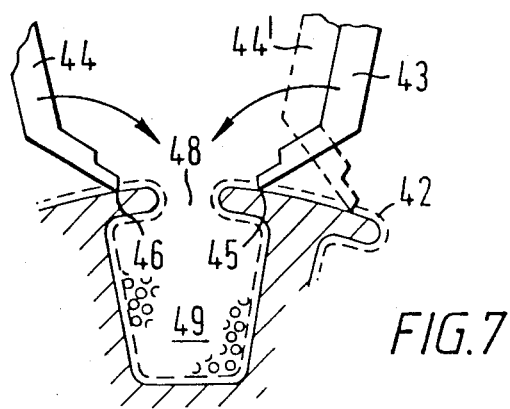
FIG. 7 is a fragmentary cross-section showing part of an armature provided with a slot liner about to be cut aas the first stage in a cut and tuck operation.
Figure 8:
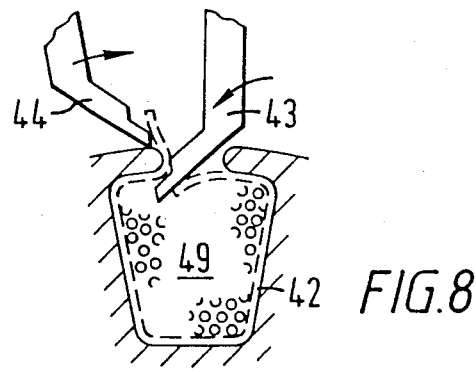
FIG. 8 is a view similar to FIG. 7 but showing the first step of the tuck operation.

The winding pallets then pass to a slot lining finishing station 41 (FIG. 2E) where they are sensed and detained individually to each side of the stationary partition 4. A common operating head descends and the following operations are performed on each lining. As indicated in FIG. 7, the slot liner 42 initially extends around the entire peripheral surface of the armature.

Figure 9:
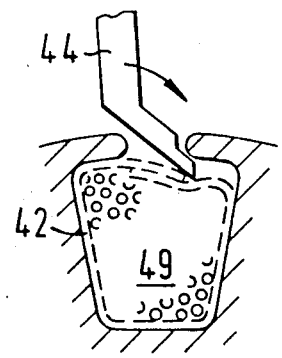
FIG. 9 shows the second step of the tuck operation.

In the first stage a pair of jaws 43, 44 descend and sever the slot line 42 at locations 45 and 46. The ends of the slot liner spring outwardly under their own resilience. The jaw 43 then moves to the left and is biased towards the centre of the armature. The jaw 43 enters the opening 48 of the slot 49. As it moves from its initial position the jaw 43 displaces the cut portion of the slot liner 42 to the position shown in FIG. 8. The jaw 43 is then retracted and jaw 44 is moved to the right and biased into the opening 48 as shown in FIG. 9. Jaw 44 is then retracted leaving slot 49 completely lined. The armature is then indexed and the procedure repeated for all the slots. It will be noted from FIG. 7 that a small portion of the slot liner 42 lying between jaws 43 and 44' (the position of jaw 44 after reindexing) is not used. This is simply blown away and disposed of.

TRICKLE STATION

The winding pallets then pass to the trickle station 50 (FIGS. 2E and 10) where the wound armatures are removed from the winding pallets which are returned to the beginning of the winding area.

Figure 2E:
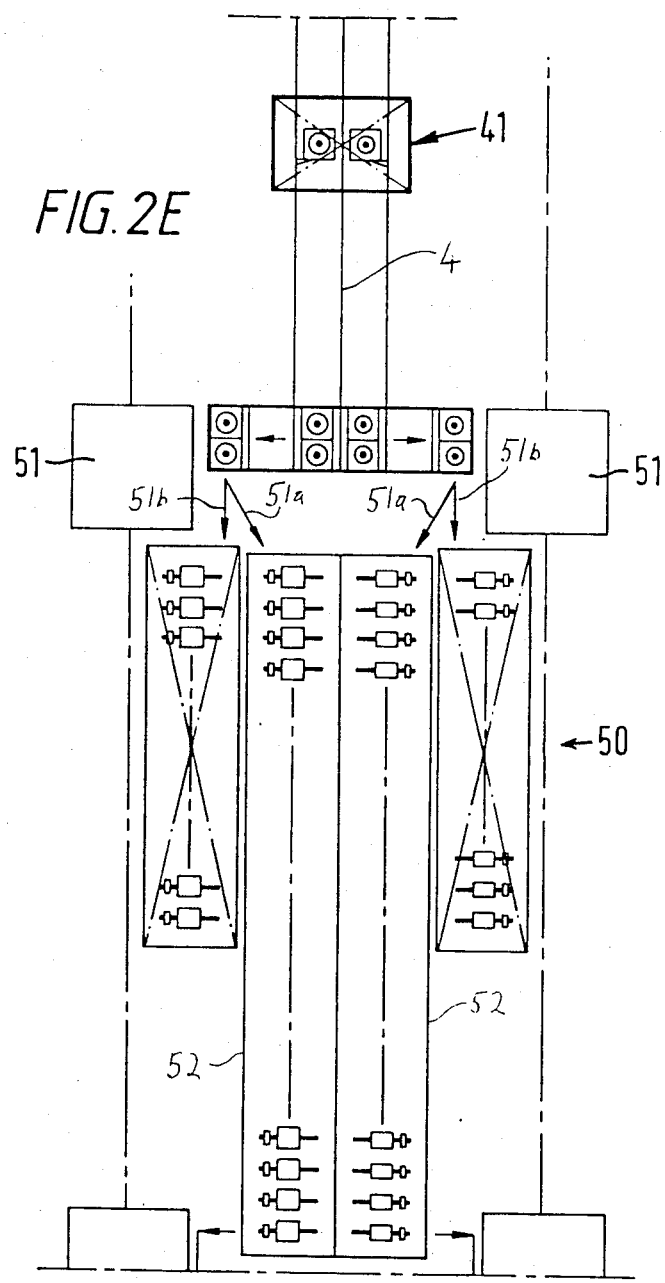
Figure 2F:
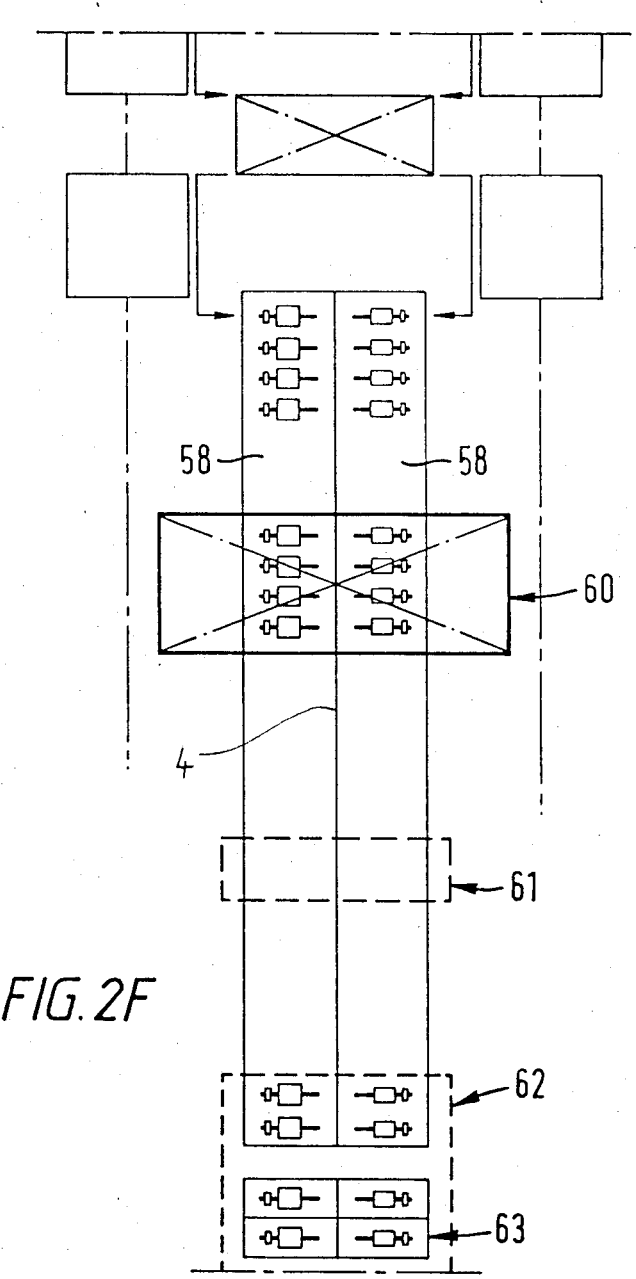

The wound armatures are moved outwardly to a pick and place robot 51 which orientates the armatures horizontally. The armatures are presented to the respective robot 51 two at a time as indicated in FIG. 2E. The robots 51 place the armatures in chucks on conveyor belts 52, as indicated by the arrows 51a. Should either conveyor 52 be full, then the respective robot 51 places the armatures in a buffer outside the full conveyor 52, as indicated by the arrows 51b. The robots 51 will draw from these buffers when no armatures are being supplied to the robots. At the end of the trickle station is a vertical cooling tower 56 (FIG. 2F). After cooling, the armatures are transferred to walking beam conveyors 58.

Figure 10:
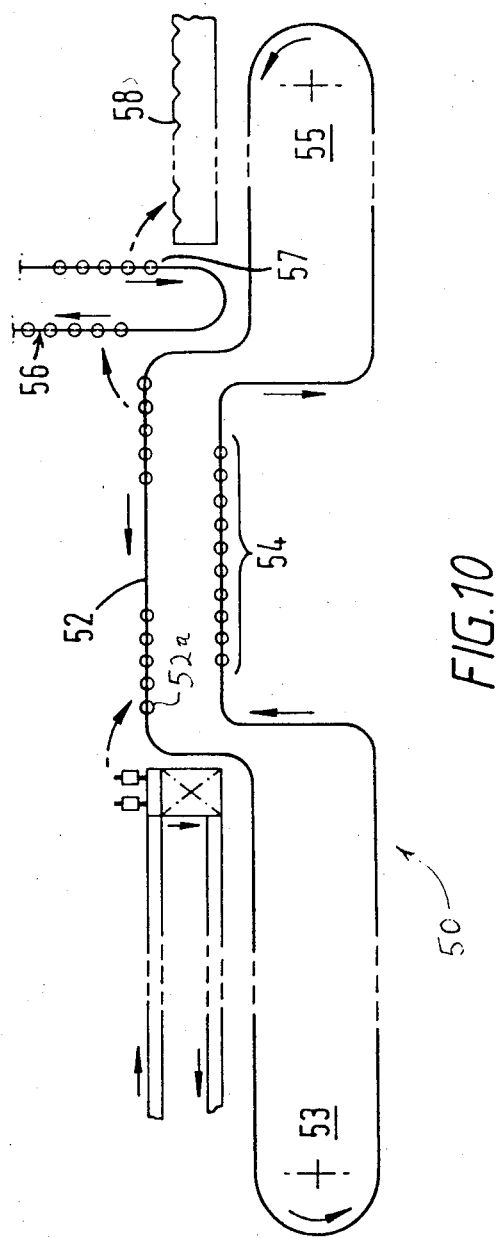
FIG. 10 is a schematic side elevation of a trickle station.

The trickle station 50 and cooling tower 56 are further illustrated diagrammatically in FIG. 10 which is a side view taken from the left side of FIGS. 2E and 2F. The armatures, carried in chucks 52a, are first moved by the conveyor 52 downwards and then through a preheating oven 53 in which they are preheated. Next they pass through trickle zone 54 where drops of molten insulating resin are trickled onto the armatures. The resin permeates the structure by capillary action. Then the armatures are passed by the conveyor 52 through a curing zone 55. The armatures are then transferred to a vertically extending conveyor in the cooling tower 56. After being cooled, the armatures are unloaded at location 57 onto the walking beam conveyor 58.

COMMUTATOR TURN

Returning to FIG. 2F, the armatures are next fed by the conveyor 58 into a commutator turn station 60 where they are rotated while a brush is applied to the commutator ring.

FAN PLACEMENT

The armatures then pass to a fan placement station 61 (FIG. 2F) where they are sensed and detained individually to each side of the stationary partition 4. A common operating head then places the fans on the armature shafts on the respective lines.

Figure 2G:
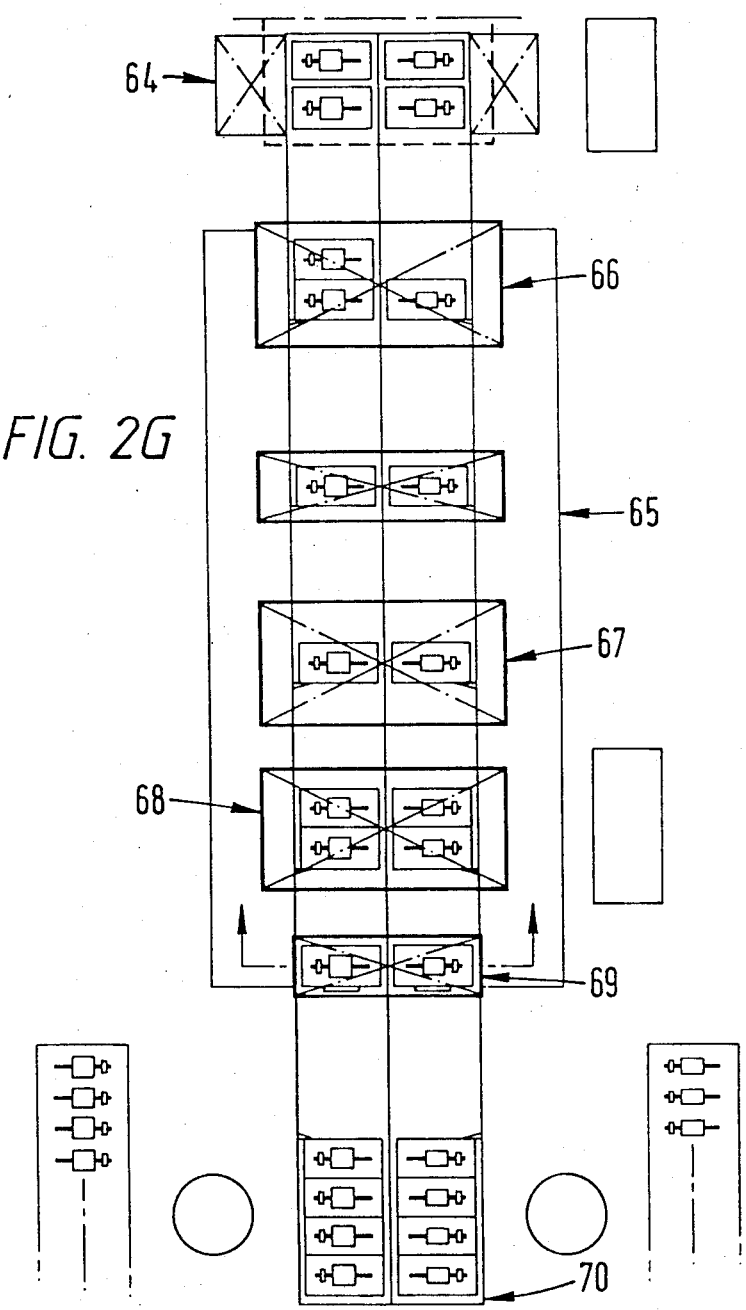

The armatures are then transferred by a pick and place unit 62 (FIG. 2F) to a measuring station 63. The armatures are then transferred to balance line pallets which enter an elevator 64 (FIG. 2G). The balance lines pallets leaving elevator 64 enter a balancing station 65 (FIG. 2G). The balance is first checked at station 66 and any corrective action written to a magnetic memory on the balance line pallet. The armature then passes to an indexing station where the armature is indexed prior to entering a milling station 67 where material is removed from the circumference of the rotor. Finally, the balance of the armature and the electrical connections are tested at station 68 (FIG. 2G).

Reject units are marked and are automatically diverted to the side at diverter station 69 (FIG. 2G). Where further balancing is required the reject unit is returned to station 66 (FIG. 2G). Where there is an electrical fault, the units can be checked manually and repaired where practical.

The completed armatures are unloaded by robots at the end 70 (FIG. 2G) of the dual highway production line apparatus, and the empty balance line pallets returned for further use.

The arrangement thus far describes has significant advantages over the prior art. In particular, each highway may be dedicated to the production of an armature of a specific size or specification. However, many operations may be carried out in unison on both production lines using the same operating head. Furthermore, considerable capital expenditure is saved in the area of the trickle station where the cost of a large single trickle station servicing both production lines is very much less than the cost of two separate trickle stations as previously required.

Further, although each highway may be dedicated to a specific armature specification, when one highway is working at a higher production rate than the other, some of the armatures of the higher production rate highway can be transferred to the lower production rate highway for one or more operations to be performed, and then returned to their original highway. In this way, the overall production rate of the dual highway can be increased when more of one specification of the armature is require than another specification. The same approach is also used in stator assembly production as will be described later.

Whenever possible, equipment for performing operations on the armatures of both production lines should be placed to one side of the dual highway, thereby maximising operator access from the other side of the dual highway. While the arrangement thus far described has significant advantages over the prior art in steady state operation, its main advantage comes when there is a sudden demand for one or other of the two armatures. Normally the bottleneck in any armature production line is the winding area. If there is a sudden demand then this can only be met within the capacity of the winding area. In the arrangement described, when a high demand, for example for 47 mm armatures arises, a winder normally on the 57 mm production line is assigned for winding 47 mm armatures. When this winder is ready, a signal is sent to the shuttle 71 which takes armatures from the 47 mm production line until the queue is replenished to keep the winder queue full. The winder recognises the 47 mm armatures by virtue of their identity inserts. Consequently, 57 mm armatures are not admitted to the winder queue. The wound 47 mm armatures pass down the 57 mm production line until they approach the shuttle 72 where they are identified and returned to the 47 mm line.

Similarly, armatures can be shuttled from the 57 mm production line to the 47 mm production line and back again if required.

The production of stators according to the invention will now be described.

DUAL HIGHWAY STATOR PRODUCTION LINE

Figure 12A:
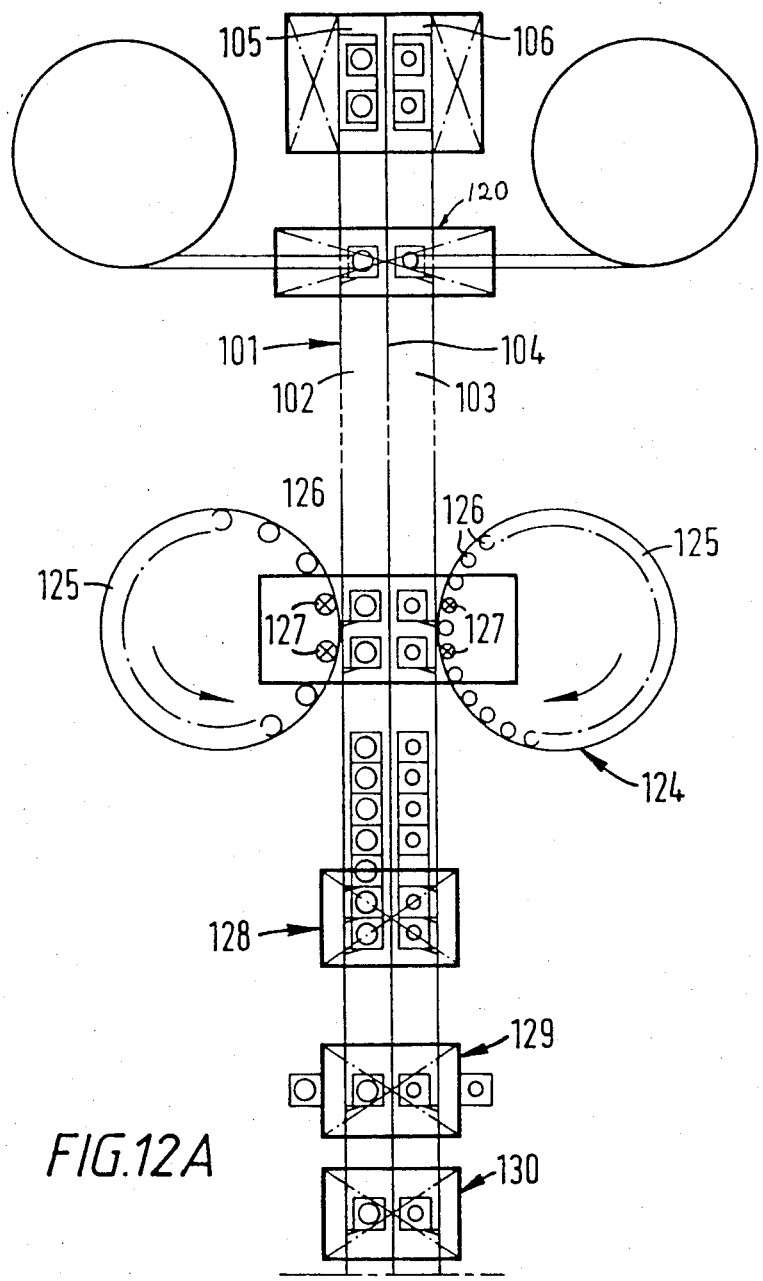
FIGS. 12A, B and C show a schematic layout of a dual highway stator production line.
Figure 12B:
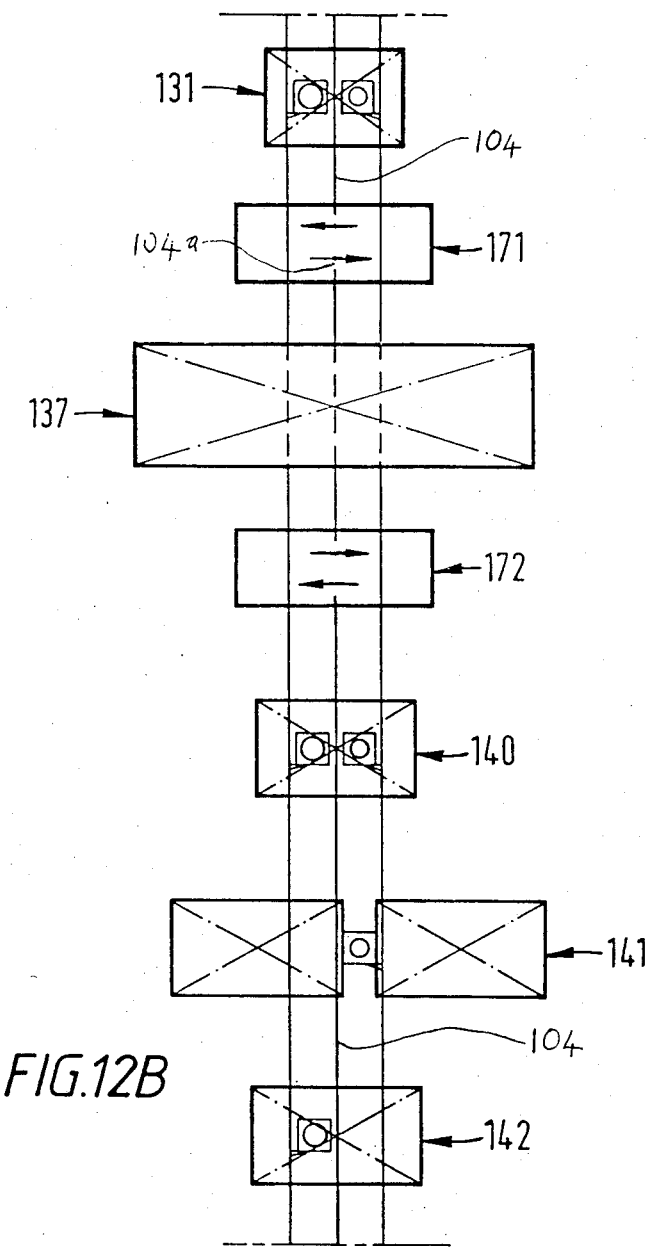
Figure 12C:
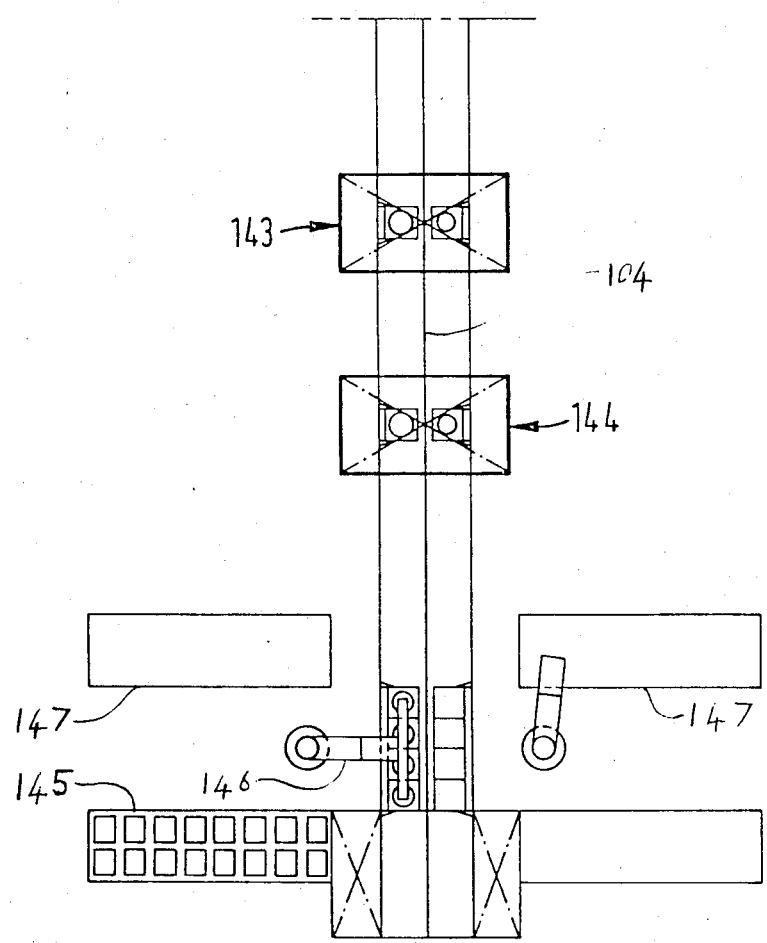

Referring to FIGS. 12A to C, there is shown a dual highway stator production line which is generally identified by reference numeral 101. The dual highway stator production line 101 comprises two conveyors 102 and 103 which are separated by a stationary partition 104. The conveyors 102 and 103 are driven at the same speed by separate and distinct variable speed motors (not shown).

ELEVATOR

Two elevators 105 and 106 (FIG. 12A) are arranged to raise stator assembly pallets to the level of conveyors 102 and 103 respectively. The elevators 105 and 106 are similar to the elevators 5 and 6 in FIGS. 2A and 3.

STATOR ASSEMBLY PALLETS

FIG. 13 shows a stator assembly pallet which is generally identified by reference numeral 108. The stator assembly pallet is made of mild steel and comprises a base 109 which is approximately 75 mm wide and 75 mm long. The top of the base 109 is provided with two upwardly extending lamination locators 110 and 111 which are disposed to either side of a bore 112. The top of the base 109 is also provided with four upwardly extending wire clips 113a, b, c and d. One side of the base 109 is provided with a slot 114 which accommodates an identifying insert 115. The bottom of the base is provided with a positioning arrangement which comprises a vertically extending bore 116.

BOTTOM END RING PLACEMENT

The first stage in making the stator is bottom end ring placement which occurs at station 120 (FIG. 12A). As each stator pallet on each conveyor 102, 103 enters the station 120 it is identified and held fast by a locator pin entering vertically extending bore 116. A common operating head moves into position and the bottom end rings are then placed over the respective holes 112 and the stator assembly pallets released.

STACKER STATION

The stator assembly pallets pass to a stacker station 124 (FIG. 12A) where they are sensed and detained in pairs to each side of the stationary partition 104. A disperser 125 is disposed to each side of the production line. Each disperser contains a plurality of stacks 126 of stator laminations 127. The stator laminations are loaded onto the stator assembly pallets in a manner analogous to the operation of the stacker station on the armature production line described hereinbefore.

SPLIT STACK STATION

Figure 14:
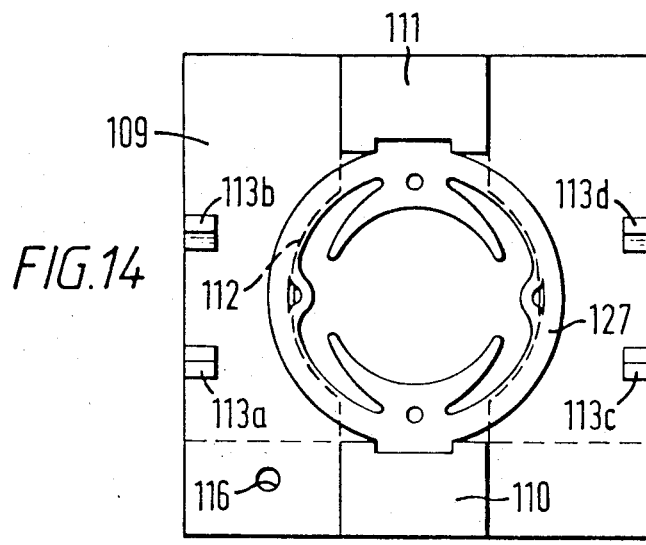
FIG. 14 is a plan view of the stator assembly pallet loaded with a stack of laminations.
Figure 15:
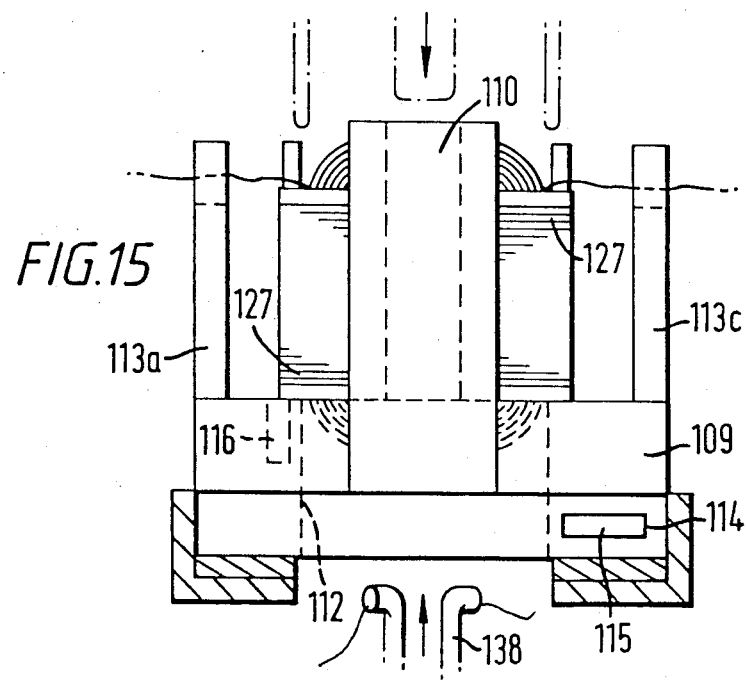
FIG. 15 is a side elevation of the stator assembly pallet immediately after winding.

The stator assembly pallets then enter a split stack station 128 (FIG. 12A) where the stacks are treated in a manner similar to the armature laminations in the armature split stack station 28 (FIG. 2A). FIG. 14 is a plan view of the stator assembly pallet immediately after this operation.

MEASURING STATION

The stator assembly pallets then pass to a measuring station 129 (FIG. 12A) where the height of each stack is measured and, if necessary, one lamination removed by a vacuum head.

SLOT LINER PLACEMENT

The stator assembly pallets then pass to slot insulation placement stations 130 (FIG. 12A) where they are sensed and detained. A placement head is lowered onto each stack and injects the slot liners after the pallet has been indexed into position.

TOP END RING PLACEMENT

The stator assembly pallets then pass to station 131 (FIG. 12B) where they are sensed and detained in pairs to each side of the stationary partition 104. A common operating head moves downwardly and places the top end ring assemblies on the tops of the stacks.

WINDING AREA

The stator assembly pallets then pass to winding area 137 (FIG. 12B) where the field windings are applied in the manner set out in U.S. patent application Ser. No. 737,104 (now U.S. Pat. No. 4,612,702) the disclosure of which is hereby incorporated herein by reference.

Essentially, once each stator assembly pallet is in the winding position a pair of clamps descend to hold it firmly in place. A pair of hollow needles 138 (FIG. 15) containing magnet wire rise upwardly through the bore 112 in the stator assembly pallet 109 and through the center of the stack of stator laminations. The needles 138 pause at the top of their travel while tooling secures the ends of the magnet wire to wire clips 113a and 113b. The needles 138, which are eccentrically offset with respect to the longitudinal central axis of the stator, then proceed to move upwards and downwards, pivoting alternately in a clockwise and an anti-clockwise sense at the end of each movement to create the field windings without the employment of temporarily positioned winding forms. At the end of this process, the needles 138 again pause at the top of their travel while tooling secures the other end of the wires to the reamining wire clips 113c and 113d.

COIL LEAD ASSEMBLY

The stator assembly pallets then pass to a coil lead assembly station 140 (FIG. 12B) where a tool grasps the start and end lead portions of the magnet wire, removes them from the wire clips, loops them over strain reliefs in the top end ring, and turns them around terminal hooks thereon. Excess wire is then cut off and removed.

TERMINAL FUSE STATION

The stator assemblies on the 47 mm production line then pass to a station 141 (FIG. 12B) where the wires are fused to the terminals. For this purpose the stator assembly pallet is correctly positioned. The stator is then raised so that the terminals are disposed between two horizontally opposed weld heads. The stator is then indexed and the weld heads activated to fuse two wires to their respective terminals. The armature is then reindexed and the process repeated. Finally, the stator is returned to its pallet.

CRIMPING STATION

The stator assembly pallets on the 57 mm production line pass into a crimping station 142 (FIG. 12B) where the terminals are crimped around the magnet wires and a continuity check made.

BONDING STATION

The stator assembly pallets then pass into a bonding station 143 (FIG. 12C) where the terminals are connected to a source of electricity. As the windings heat they melt an adhesive coating applied to the stator laminations. When the current is switched off the adhesive hardens thereby bonding the stator laminations together.

TEST

Finally, the completed stator is tested at station 144 (FIG. 12C). The stators which pass the test are unloaded by robots and the stator assembly pallets returned to the start of the stator production line. A load leveler storage magazine 145 containing tested stators is shown being loaded by a robot arm 146. Standby empty magazines 147 are also shown. When loaded, the storage magazines are then transferred to a storage area.

SHUTTLE STATIONS

As with the armature production line, shuttles 171 and 172 (FIG. 12B) are provided immediately upstream and downstream of the winding area 137 so that production of one type of stator can be increased at the expense of the other. Thus, to increase the production of 57 mm stators, a winder on the 47 mm production line may be allocated for 57 mm winding duty. The winder has its own internal queue. When the queue is not full a signal is sent to the shuttle 171 which transfers a pallet from the 57 mm production line, past the highway dividing partition 104 through a gap 104a therein, to the 47 mm production line. When the stator assembly pallet carrying the 57 mm stator body arrives, it is identified by its identity insert and admitted to the conscripted winder. When the wound stator approaches the downstream shuttle 172, it is recognised and returned across the partition 104 through a gap therein to the 57 mm production line.

Although the shuttles have been placed upstream and downstream of the winding areas they could additionally or alternately be placed in other locations. The shuttles 171 and 172 are the same as the shuttle 71 and 72 in the armature production line.

The armature and stator production lines described above save an estimated 60 to 70% of the floor space occupied by separate production lines used in the prior art. Furthermore, labour can be reduced by between 25 and 50% since one machine minder can watch the production of two different armatures or two different stators simultaneously.

BUFFER STORAGE

Figure 16:
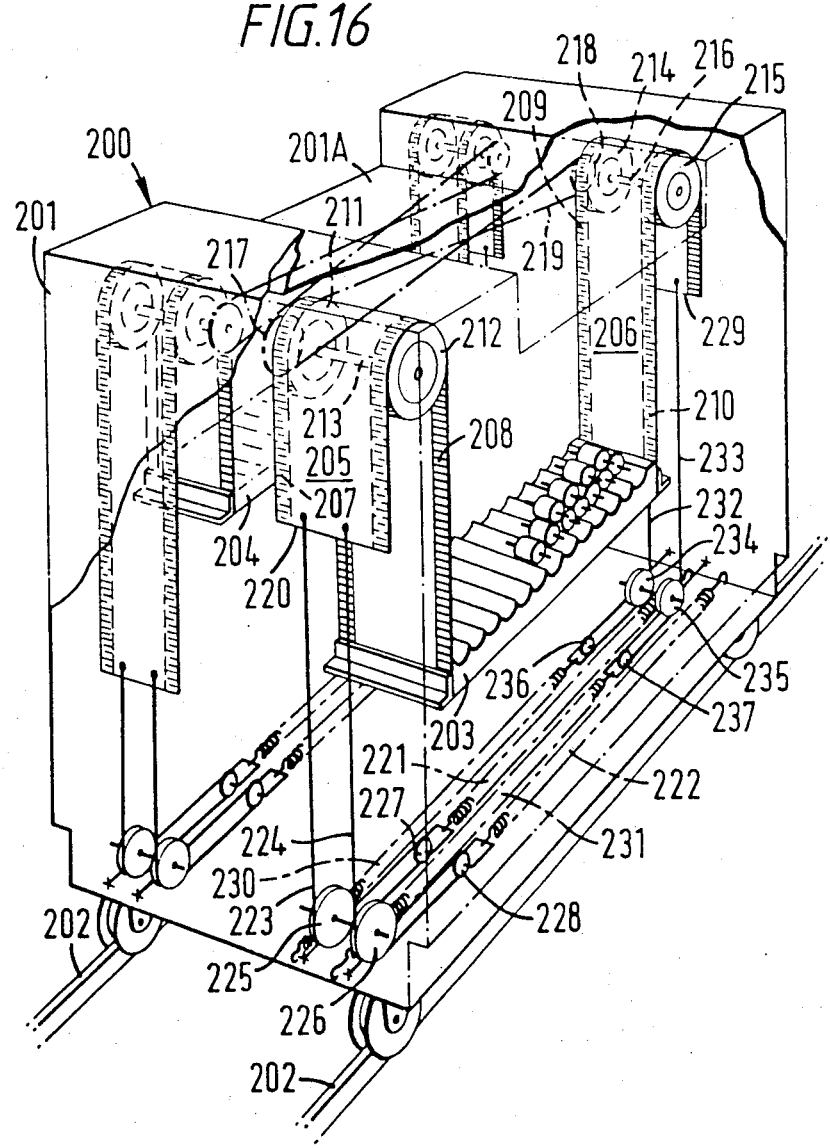
FIG. 16 is a perspective view of a buffer storage for armatures.

Referring to FIG. 16 there is shown a buffer storage which is generally identified by reference numeral 200. The buffer storage 200 comprises a trolley 201 arranged to run on rails 202. The trolley 201 is provided with two platforms 203 and 204 which are arranged side by side. The platform 203 is supported by two belts 205, 206, the longitudinal edges of which are provided with toothed strips 207, 208; 209 and 210 respectively. The toothed strips 207, 208 pass over toothed wheels 211, 212 which are secured fast on a shaft 213. Similarly, the toothed strips 209, 210 pass over toothed wheels 214, 215 which are secured fast on a parallel shaft 216. A gear wheel 217 is mounted fast on the end of the shaft 213 and is connected to a gear wheel 218, fast on shaft 216, by a chain 219 which is arranged in the shape of a figure eight. The free end of the belt 205 is connected to the base of the trolley 201 by means of a pair of wires 223, 224 which pass around pulleys 225, 226 and pulleys 227, 228 attached to springs 221 and 222. Similarly, the free end 229 of the belt 206 is connected to the base of the trolley by means of a pair of wires 232, 233 which pass around pulleys 235, 235 and pulleys 236, 237 attached to springs 236, 231. Platform 204 is supported by a mechanism similar to platform 203. Both platforms 203 and 204 are scalloped as shown to receive a plurality of armatures. The lengths of the support wires are adjusted to that the platforms 203 and 204 are substantially level with the top of the insert portion 201A of the trolley 201 when the trolley 201 is unladen.

In use, armatures are progressively loaded onto the scalloped platforms 203, 204 and, as the weight of the load increases, so the respective platform lowers. By the time the platform has one complete row of armatures thereon, the platform has descended by an amount such that the tops of the armatures thereon are now approximately level with the inset portion 201A of the trolley 201. Another layer of armatures can then be placed on the first layer and so on until the buffer storage 200 is full, each platform being loaded independently. As armatures are removed from the buffer storage 200, the respective platform 203, 204 rises, so that at any given time an automatic pick and place unit will have no difficulty in gripping in sequence the next armature.

Spacers (not shown) are mounted at spaced vertical intervals on the belts 205, 206 to facilitate placement of armatures, bearing in mind that alternate rows are offset from one another by one half the diameter of the armature. The platform 203 is kept horizontal by the chain 219 which ensures that any rotation of toothed wheels 214 and 215 is matched by an equal and opposite rotation of toothed wheels 211 and 212. The springs 221, 222, 230 and 231 are, of course, chosen to give the desired load/extension ratio required.

The trolley arrangement shown in FIG. 17 is generally similar to that shown in FIG. 16, except that four pins 244 are mounted fast with respect to the base of the trolley and extend through holes 245 in a platform. This arrangement is primarily intended for the storage of gears and the like which are stacked on the platform with the pins extending upwardly through the centers of the stacks.

FIG. 18 shows the buffer storage 200 of FIG. 16 in use in an armature production line. In particular, the trolley 201 is rolled into place on rails 202 beneath a robot 246. In steady state operation, the robot 246 simply transfers armature core assemblies from armature assembly pallets in line 247 to winding pallets in line 248. If the winding line 248 is fully occupied, the robot 246 transfers armature core assemblies from the assembly pallets in line 1247 to the buffer storage 200. For this purpose the robot 246 has intelligent "X" and "Y" axis movement and can consequently progressively load the buffer storage 200. If the winding line becomes free when no armature core assemblies are available on line 247, then the robot 246 takes an armature from the buffer storage 200. The robot's memory may be programmed so that it carries a complete inventory of the buffer storage 200. By extending the travel of the robot 246, a single robot 246 may service three winding lines in addition to a single armature assembly line.

The buffer storage for gears shown in FIG. 17 can similarly be incorporated n the armature production line at a station for mounting gears on the armature shafts. The above described embodiments, of course, are not to be construed as limiting the breadth of the present invention. Modifications, and other alternative constructions, will be apparent which are within the spirit and scope of the invention as defined in the appended claims.

What is claimed:

1. Apparatus for manufacturing major subassemblies of electric motors, comprising:
   two production lines disposed side by side and separated along at least part of the length thereof by a common partition;
   either production line being capable of performing at least one operation on subassemblies being produced on the other production line;
   means for transferring at least some of the subassemblies from one to the other side of said partition for enabling said one operaton to be performed on the transferred subassemblies;

each said production line including a coil winding station, said at least one operation comprising coil winding, and said transferring means being disposed upstream of said coil winding station;

return transfer means, disposed downstream of said coil winding station, for transferring said transferred subassemblies back to their original production line on said one side of said partition;

buffer storage means for storing parts of the electric motors, said buffer storage means comprising a horizontal platform for supporting said parts in layers, and means for lowering said platform as the latter is loaded and for maintaining said platform horizontal as it is lowered;

each end of said platform being supported by a respective belt which is connected at one end to the platform, passes upwardly and over a respective wheel, and is connected at the other end to a spring;

each said wheel being provided with teeth which mesh with teeth of the respective belt; and the respective wheels being spaced apart and interconnected by a chain arranged in a figure eight configuration, whereby any vertical movement of one end of said platform is accompanied by an equal vertical movement at the other end of said platform.

2. The apparatus of claim 1, wherein said platform is scalloped to receive a row of armatures.

3. The apparatus of claim 1, wherein said platform has mounted thereon at least one pin for stacking gears thereon, the pin extending upwardly through the gears.

4. The apparatus of claim 1, wherein said buffer storage means comprises two such horizontal platforms disposed side by side and movable vertically independently of each other.

5. The apparatus of claim 1, wherein said buffer storage means comprises a trolley arranged to run on rails.

6. Apparatus for manufacturing major subassemblies of electric motors, comprising:

two production lines extending side by side;

means for transferring at least some of the subassemblies from either of said production lines to the other of said production lines;

each said production line including a coil winding station, and said transferring means being disposed upstream of said coil winding station;

return transfer means, disposed downstream of said coil winding station, for transferring the transferred subassemblies back to their original production line;

buffer storage means for storing parts of the electric motors, said buffer storage means comprising a horizontal platform for supporting said parts in layers, and means for lowering said platform as the latter is loaded and for maintaining said platform horizontal as it is lowered;

each end of said platform being supported by a respective belt which is connected at one end to the platform, passes upwardly and over a respective wheel, and is connected at the other end to a spring;

each said wheel being provided with teeth which mesh with teeth of the respective belt; and the respective wheels being spaced apart and interconnected by a chain arranged in a figure eight configuration, whereby any vertical movement of one end of said platform is accompanied by an equal vertical movement at the other end of said platform.

7. The apparatus of claim 6, wherein said platform is scalloped to receive a row of armatures.

8. The apparatus of claim 7, wherein said buffer storage means comprises two such horizontal platforms disposed side by side and movable vertically independently of each other.

9. The apparatus of claim 8, wherein said buffer storage means comprises a trolley arranged to run on rails.

10. The apparatus of claim 6, wherein said platform has mounted thereon at least one pin for stacking gears thereon, the pin extending upwardly through the gears.

11. The apparatus of claim 6, wherein said parts of the electric motors are armature core assemblies, and said buffer storage means is disposed upstream of said coil winding station; and further comprising means for loading said core assemblies into said buffer storage means when said winding station is not ready to accept them.

* * * * *